United States Patent
Fang et al.

(10) Patent No.: US 11,363,494 B2
(45) Date of Patent: Jun. 14, 2022

(54) METHOD AND APPARATUS FOR SESSION OFFLOADING, DEVICE AND STORAGE MEDIUM

(71) Applicant: ZTE Corporation, Shenzhen (CN)

(72) Inventors: Jianmin Fang, Shenzhen (CN); Xiaojuan Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/610,617

(22) PCT Filed: Apr. 18, 2018

(86) PCT No.: PCT/CN2018/083554
§ 371 (c)(1),
(2) Date: Nov. 4, 2019

(87) PCT Pub. No.: WO2018/201897
PCT Pub. Date: Nov. 8, 2018

(65) Prior Publication Data
US 2020/0077302 A1  Mar. 5, 2020

(30) Foreign Application Priority Data

May 4, 2017 (CN) .......................... 201710309151.9

(51) Int. Cl.
*H04W 76/30* (2018.01)
*H04W 8/08* (2009.01)
*H04W 28/08* (2009.01)
*H04W 76/15* (2018.01)
*H04W 36/00* (2009.01)
(Continued)

(52) U.S. Cl.
CPC ............ *H04W 28/08* (2013.01); *H04W 16/32* (2013.01); *H04W 24/08* (2013.01); *H04W 36/0069* (2018.08); *H04W 76/15* (2018.02)

(58) Field of Classification Search
None
See application file for complete search history.

(56) References Cited

U.S. PATENT DOCUMENTS

2015/0282152 A1   10/2015   Wang
2017/0034756 A1*  2/2017    Faccin ............. H04W 28/0268
(Continued)

FOREIGN PATENT DOCUMENTS

| CN | 104247547 A | 12/2014 |
|----|-------------|---------|
| CN | 105848222 A | 8/2016  |
| EP | 2903225 A1  | 8/2015  |

OTHER PUBLICATIONS

ZTE Corporation, 3GPP TS 23.501 Calculation of UE Ambr, SA WG2 Meeting #120, S2-172203, Mar. 31, 2017, pp. 1-3.
(Continued)

*Primary Examiner* — Gary Lafontant
(74) *Attorney, Agent, or Firm* — Cantor Colburn LLP

(57) ABSTRACT

Disclosed are a method and apparatus for session offloading, a device, and a storage medium. The method includes following steps: a primary base station determines a session aggregation maximum bit rate (AMBR) of an offloaded session at a secondary base station; and the primary base station sends the session AMBR at the secondary base station to the secondary base station.

21 Claims, 4 Drawing Sheets

(51) Int. Cl.
*H04W 16/32* (2009.01)
*H04W 24/08* (2009.01)

(56) References Cited

U.S. PATENT DOCUMENTS

2018/0014237 A1* 1/2018 Xu .................... H04W 76/10
2020/0059989 A1* 2/2020 Velev .................. H04W 8/08

OTHER PUBLICATIONS

International Search Report for corresponding application PCT/CN2018/083554 filed Apr. 18, 2018; dated Jul. 20, 2018.
European Search Report for corresponding application EP 18 79 4793; Report dated Oct. 23, 2020.

* cited by examiner

METHOD AND APPARATUS FOR SESSION OFFLOADING, DEVICE AND STORAGE MEDIUM

CROSS-REFERENCE TO RELATED APPLICATIONS

This is a National Stage Application, filed under 35 U.S.C. 371, of International Patent Application No. PCT/CN2018/083554, filed on Apr. 18, 2018, which claims priority to Chinese patent application No. 201710309151.9 filed on May 4, 2017, contents of both of which are incorporated herein by reference in their entireties.

TECHNICAL FIELD

The present application relates to the field of communications and, in particular, to a method and apparatus for session offloading, a device, and a storage medium.

BACKGROUND

In the related art, a 5G (New Radio) network will include three types of base stations: a next generation node base-station (gNB), an enhanced long term evolution (eLTE) evolved node base-station (eNB), and a long term evolution (LTE) eNB. The gNB is a 5G base station and is connected to a 5G core network (5GC) through a NG interface. The LTE eNB is a 4G base station and is connected to a core network evolved packet core (EPC) through an S1 interface. The eLTE eNB is a 4G-to-5G transition type base station and is capable of being connected to both the core network EPC (through the S1 interface) and the 5GC (through the NG interface). A connection interface between the LTE eNBs is called an X2 interface, and a connection interface between the gNBs is called an Xn interface. The eLTE eNBs may not only play the role of the LTE eNB but also play the role of the gNB.

In a long term evolution (LTE) system, data flows with the same quality of service (QoS) requirements are aggregated into a bearer, and QoS processing on the base station and the core network is performed according to bearers. In a 5G system, a new QoS mechanism will be adopted to support 5G services such as an enhanced mobile broadband (eMBB), a massive machine type communication (mMTC), and an Ultra Reliable and Low Latency Communication (URLLC).

In the new QoS mechanism of the 5G, a user equipment (UE) may be built with multiple protocol data unit sessions (PDU Sessions). One PDU Session may contain multiple quality of service flows (QoS Flows). Multiple QoS Flows of the same PDU Session may be mapped to the same data radio bearer (DRB)., and QoS Flows of different PDU Sessions cannot be mapped to the same DRB.

When a dual connectivity (DC) operation is performed in the 5G network, part of the PDU Session of one UE and/or part of the QoS Flows in the PDU Session may be offloaded from a primary base station to a secondary base station. However, there is no specific scheme for how to allocate and calculate the session aggregate maximum bit rate (Session AMBR) representing a maximum allowable bit rate of one PDU Session and the UE AMBR representing the maximum allowable bit rate of one UE at the time of the DC operation.

SUMMARY

The embodiments of the present disclosure provide a method and apparatus for session offloading, a device, and a storage medium, so as to perform the allocation and calculation of a session aggregate maximum bit rate (AMBR) and a user equipment (UE) AMBR during a DC operation.

An embodiment of the present disclosure provides a method for session offloading, the method includes: a primary base station determines a session AMBR of an offloaded session at secondary base station; and the primary base station sends the session AMBR at the secondary base station to the secondary base station.

An embodiment of the present disclosure provides another method for session offloading, the method includes: a core network calculates a session AMBR of an offloaded session at a secondary base station; and the core network sends the session AMBR at the secondary base station to a primary base station.

An embodiment of the present disclosure provides still another method for session offloading, the method includes: a secondary base station receives, from a primary base station, a session AMBR of an offloaded session at the secondary base station; and the secondary base station calculates a user equipment (UE) AMBR at the secondary base station according to the session AMBR at the secondary base station.

Another embodiment of the present disclosure provides an apparatus for session offloading, the apparatus for session offloading is applied to a primary base station. The apparatus includes a determination module and a sending module. The determination module is configured to determine a session AMBR of an offloaded session at a secondary base station. The sending module is configured to send the session AMBR at the secondary base station to the secondary base station.

An embodiment of the present disclosure provides another apparatus for session offloading, the another apparatus for session offloading is applied to a core network. The apparatus includes a calculation module and a sending module. The calculation module is configured to calculate a session AMBR of an offloaded session at a secondary base station. The sending module is configured to send the session AMBR at the secondary base station to a primary base station.

Another embodiment of the present disclosure provides still another apparatus for session offloading, the still another apparatus for session offloading is applied to a secondary base station. The apparatus includes a receiving module and a calculation module. The receiving module is configured to receive, from a primary base station, a session AMBR of an offloaded session at the secondary base station. The calculation module is configured to calculate a User Equipment (UE) AMBR at the secondary base station according to the session AMBR at the secondary base station.

An embodiment of the present disclosure further provides a storage medium, the storage medium is configured to store a program code for performing the following steps:

a session AMBR of an offloaded session at a secondary base station is determined; and the session AMBR at the secondary base station is sent to the secondary base station.

An embodiment of the present disclosure further provides a device for session offloading. The device for session offloading includes a processor and a memory for storing a computer program executable by the processor. The processor, when executing the program, implements the steps in the method described above.

According to the embodiments of the present disclosure, the primary base station determines the session AMBR of the offloaded session at the secondary base station; the primary base station sends the session AMBR at the secondary base station to the secondary base station, so as to perform the allocation and calculation of a session AMBR and a UE AMBR during a DC operation.

BRIEF DESCRIPTION OF DRAWINGS

The drawings described herein are intended to provide a further understanding of the present disclosure and form a part of the present application. The exemplary embodiments and descriptions thereof in the present disclosure are intended to explain the present disclosure and do not constitute an improper limitation of the present disclosure. In the drawing.

DETAILED DESCRIPTION

The present disclosure will be described in detail hereinafter with reference to the drawings in conjunction with the embodiments. It is to be noted that, in the case of no conflict, the features in the embodiments and the embodiments in the present application may be combined with each other.

It is to be noted that the terms "first", "second" and the like in the Description, claims and the foregoing drawings of the present disclosure are used to distinguish between similar objects and are not necessarily used to describe a particular order or sequence.

Embodiment 1

Figure 1:
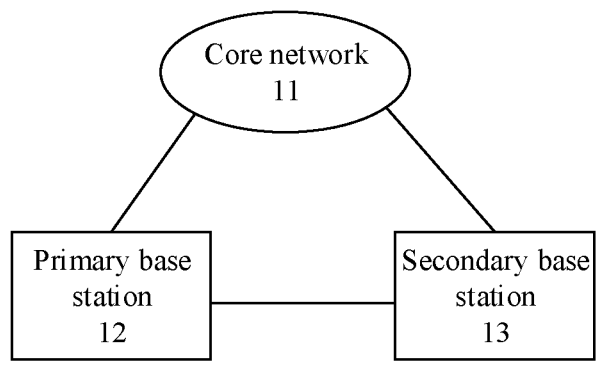
FIG. 1 is a schematic diagram of a network architecture according to an embodiment of the present disclosure.

The embodiments of the present application may be executed on a network architecture shown in FIG. 1. FIG. 1 is a schematic diagram of the network architecture according to an embodiment of the present disclosure. The network architecture includes: a core network 11, a primary base station 12, and a secondary base station 13. The core network 11, the primary base station 12 and the secondary base station 13 are connected to each other.

Figure 2:
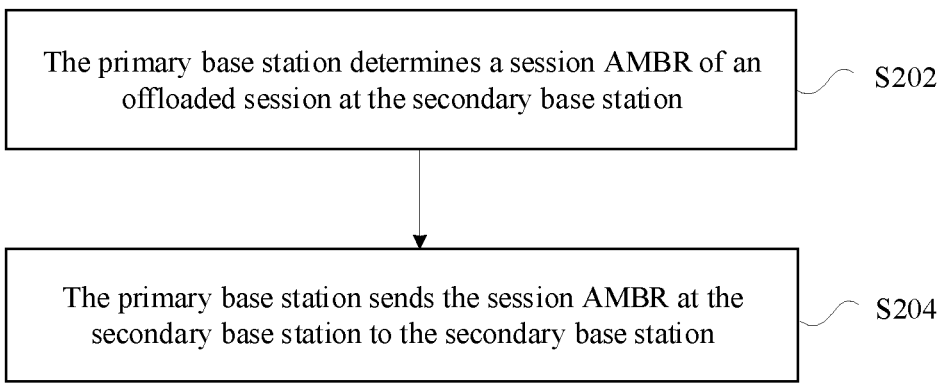
FIG. 2 is a flowchart of a method for session offloading according to an embodiment of the present disclosure.

In this embodiment, a method for session offloading executing on the above-mentioned network architecture is provided. FIG. 2 is a flowchart of a method for session offloading according to an embodiment of the present disclosure. As shown in FIG. 2, the flowchart includes steps described below.

In step S202, the primary base station determines a session aggregation maximum bit rate (AMBR) of an offloaded session at the secondary base station.

In step S204, the primary base station sends the session AMBR at the secondary base station to the secondary base station.

Through the above-mentioned steps, the primary base station determines the session AMBR of the offloaded session at the secondary base station; and the primary base station sends the session AMBR at the secondary base station to the secondary base station, the allocation and calculation of a session aggregate maximum bit rate (AMBR) and a user equipment (UE) AMBR can be performed during a DC operation.

In one or more embodiments, the step in which the primary base station determines the session AMBR of the offloaded session at the secondary base station includes one of: the primary base station acquires the session AMBR of the offloaded session at the secondary base station from the core network; or the primary base station generates the session AMBR of the offloaded session at the secondary base station.

In the embodiment of the present disclosure, the step in which the primary base station acquires the session AMBR of the offloaded session at the secondary base station from the core network includes steps described below.

In S11, the primary base station sends a first request message to the core network.

In S12, the primary base station receives the first response message fed back by the core network based on the first request message, where the first response message carries the session AMBR at the secondary base station, and the session AMBR at the secondary base station is obtained by the core network according to the first request message.

In one or more embodiments, the step in which the primary base station generates the session AMBR of the offloaded session at the secondary base station includes: the primary base station generates the session AMBR of the offloaded session at the secondary base station according to quality of service (QoS) information of a Flow offloaded to the secondary base station in the session.

In one or more embodiments, the step in which the primary base station sends the session AMBR at the secondary base station to the secondary base station includes: the primary base station sends a second request message carrying the session AMBR at the secondary base station to the secondary base station.

In one or more embodiments, the step in which the primary base station sends the session AMBR at the secondary base station to the secondary base station includes: the primary base station sends a first notification message carrying the session AMBR at the secondary base station to the secondary base station.

In one or more embodiments, after the primary base station sends the second request message carrying the session AMBR at the secondary base station to the secondary base station, the present embodiment further includes: the primary base station receives a second response message sent by the secondary base station, where the second response message is used to indicate that a request of the primary base station is completely or partially accepted, when indicating that the request of the primary base station is partially accepted, the second response message carries at least one of: a session identifier of a rejected offloaded session, a rejected session AMBR at the secondary base station, or a proposed session AMBR at the secondary base station.

In one or more embodiments, after the primary base station receives the second response message sent by the secondary base station, the method further includes: the primary base station sends a second notification message to the core network, where the second notification message carries session AMBR information at the secondary base station of a session with part of multiple Flows offloaded to the secondary base station, and the session AMBR information at the secondary base station includes a session identifier of the session, and a session AMBR of each session at the secondary base station.

In one or more embodiments, after the primary base station sends the session AMBR at the secondary base station to the secondary base station, the present embodiment further includes: the primary base station calculates a UE AMBR of the primary base station, where the UE AMBR is a sum of respective session AMBRs of the UE at the primary base station.

In one or more embodiments, the first request message carries offloading information of a Flow in the session, where the offloading information of the Flow includes: a session identifier of the session, and a Flow identifier of at least one Flow offloaded to the secondary base station in each session.

In one or more embodiments, the first request message carries offloading information of the session, where the offloading information of the session includes: a session identifier of the session, and a session AMBR or a session AMBR percentage of each offloaded session at the secondary base station.

Figure 3:
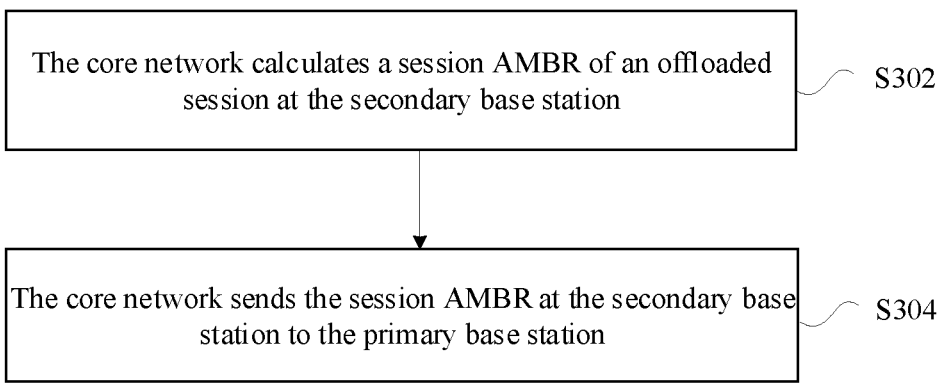
FIG. 3 is a flowchart of another method for session offloading according to an embodiment of the present disclosure.

In this embodiment, another method for session offloading executing on the above-mentioned network architecture is provided. FIG. 3 is a flowchart of another method for session offloading according to an embodiment of the present disclosure. As shown in FIG. 3, the flowchart includes steps described below.

In step S302, the core network calculates a session aggregation maximum bit rate (AMBR) of an offloaded session at the secondary base station.

In step S304, the core network sends the session AMBR at the secondary base station to the primary base station.

In one or more embodiments, the step in which the core network calculates the session AMBR of the offloaded session at the secondary base station includes steps described below.

In S21, the core network receives a first request message sent by the primary base station.

In S22, the core network calculates the session AMBR at the secondary base station according to information in the first request message.

In one or more embodiments, the first request message carries offloading information of a Flow in the session, where the offloading information of the Flow includes: a session identifier of the session, and a Flow identifier of at least one Flow offloaded to the secondary base station in each session.

In one or more embodiments, the step in which the core network calculates the session AMBR according to the information in the first request message includes: the core network obtains quality of service (QoS) information of a Flow offloaded to the secondary base station in the session according to the information in the first request message; and the core network determines the session AMBR at the secondary base station according to the QoS information of the Flow offloaded to the secondary base station in the session.

In one or more embodiments, the first request message carries offloading information of the session, where the offloading information of the session includes: a session identifier of the session, and a session AMBR or a session AMBR percentage of each offloaded session at the secondary base station.

In one or more embodiments, the step in which the core network calculates the session AMBR according to the information in the first request message includes: the core network determines the Flow offloaded to the secondary base station in the session according to the information in the first request message; the core network recalculates the session AMBR at the secondary base station according to the determined QoS information of the Flow offloaded to the secondary base station.

In one or more embodiments, the step in which the core network sends the session AMBR at the secondary base station to the primary base station includes: the core network sends the session AMBR at the secondary base station to the primary base station through a first response message, where the first response message is a feedback message to the first request message.

Figure 4:
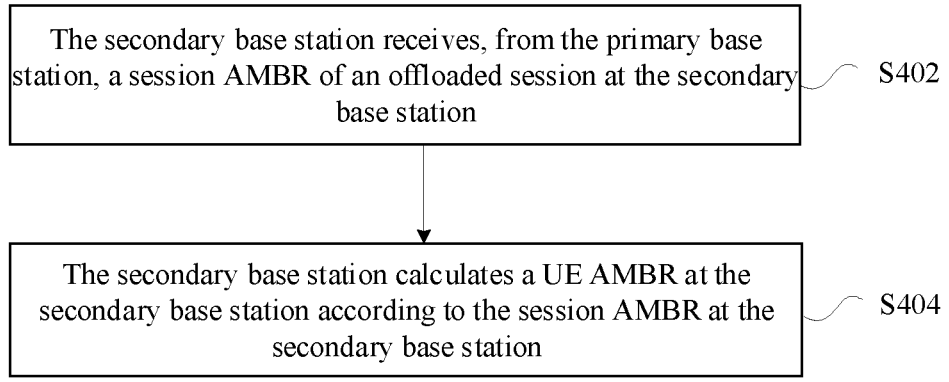
FIG. 4 is a flowchart of still another method for session offloading according to an embodiment of the present disclosure.

In this embodiment, still another method for session offloading executing on the above-mentioned network architecture is provided. FIG. 4 is a flowchart of still another method for session offloading according to an embodiment of the present disclosure. As shown in FIG. 4, the flowchart includes steps described below.

In step S402, the secondary base station receives, from the primary base station, a session aggregation maximum bit rate (AMBR) of an offloaded session at the secondary base station.

In step S404, the secondary base station calculates a user equipment (UE) AMBR at the secondary base station according to the session AMBR at the secondary base station.

In one or more embodiments, the step in which the secondary base station calculates the UE AMBR at the secondary base station according to the session AMBR at the secondary base station includes: the secondary base station determines a sum of respective session AMBRs of the UE at the secondary base station as the UE AMBR at the secondary base station.

The message type of this embodiment may be as follows:
the first request message is one of: an evolved radio access bearer (E-RAB) modification indication message, a protocol data unit (PDU) session resource indication message, or a redefined message;
the first response message is one of: an E-RAB modification confirm message, a PDU session resource confirm message, or a redefined message;
the first notification message is one of: a secondary evolved node base-station (SENB) addition request message, a secondary next generation node base-station (SGNB) addition request message, or a redefined message;
the second request message is one of: a SENB addition request message, a SGNB addition request message, or a redefined message;
the second response message is one of: a SENB addition request acknowledgement message, a SGNB addition request acknowledgement message, or a redefined message;
the second notification message is one of: an E-RAB modification indication message, a PDU session resource indication message, or a redefined message.

From the description of the above implementations, those skilled in the art may clearly understand that the method according to the embodiments described above may be implemented by means of software plus a necessary general hardware platform, or may of course be implemented by hardware. However, in many cases, the former is a preferred implementation. Based on such understanding, the present disclosure, either essentially or in terms of contributions to the related art, may be embodied in the form of a software product, the computer software product is stored in a storage medium (such as a ROM/RAM, a disk or a CD), the storage medium includes several instructions for enabling a terminal device (which may be a cell phone, a computer, a server, or a network device, etc.) to perform the methods described in various embodiments of the present disclosure.

Embodiment 2

In this embodiment, an apparatus for session offloading is also provided, and the apparatus is used for implementing the foregoing embodiments and preferred implementations, and details are not described herein. As used below, the term "module" may be software, hardware or a combination thereof capable of implementing predetermined functions. Although the apparatus described in the following embodiments is preferably implemented by software, implementations by hardware or by a combination of software and hardware are also possible and contemplated.

Figure 5:
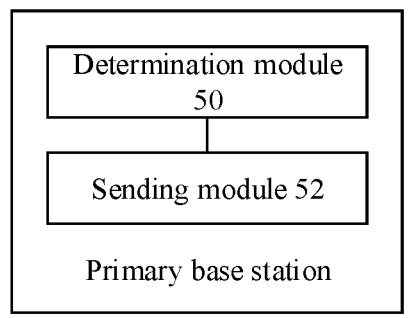
FIG. 5 is a structural block diagram of an apparatus for session offloading according to an embodiment of the present disclosure.

FIG. 5 is a structural block diagram of an apparatus for session offloading according to an embodiment of the present disclosure, the apparatus for session offloading is applied to a primary base station. As shown in FIG. 5, the apparatus includes a determination module 50 and a sending module 52.

The determination module 50 is configured to determine a session aggregation maximum bit rate (AMBR) of an offloaded session at a secondary base station.

The sending module 52 is configured to send the session AMBR at the secondary base station to the secondary base station.

In one or more embodiments, the determination module includes one of: an acquisition unit or a generation unit. The acquisition unit is configured to acquire the session AMBR of the offloaded session at the secondary base station from a core network. The generation unit is configured to generate the session AMBR of the offloaded session at the secondary base station.

Figure 6:
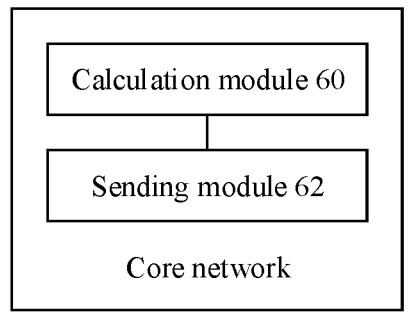
FIG. 6 is a structural block diagram of another apparatus for session offloading according to an embodiment of the present disclosure.

FIG. 6 is a structural block diagram of another apparatus for session offloading according to an embodiment of the present disclosure, the apparatus for session offloading is applied to a core network. As shown in FIG. 6, the apparatus includes a calculation module 60 and a sending module 62. The calculation module 60 is configured to calculate a session aggregation maximum bit rate (AMBR) of an offloaded session at a secondary base station. The sending module 62 is configured to send the session AMBR to a primary base station.

Figure 7:
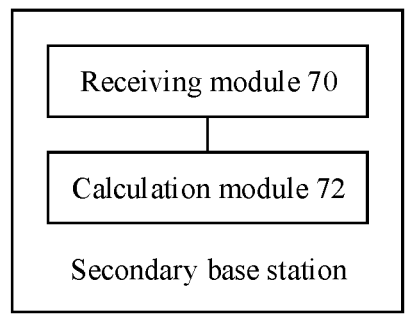
FIG. 7 is a structural block diagram of still another apparatus for session offloading according to an embodiment of the present disclosure.

FIG. 7 is a structural block diagram of still another apparatus for session offloading according to an embodiment of the present disclosure, the apparatus for session offloading is applied to a secondary base station. As shown in FIG. 7, the apparatus includes a receiving module 70 and a calculation module 72. The receiving module 70 is configured to receive, from a primary base station, a session aggregation maximum bit rate (AMBR) of an offloaded session at a secondary base station. The calculation module 72 is configured to calculate a user equipment (UE) AMBR at the secondary base station according to the session AMBR.

The description of the above apparatus embodiments is similar to the description of the above-mentioned method embodiments, and has similar beneficial effects as the method embodiments. For technical details not disclosed in the apparatus embodiments of the present disclosure, reference is made to the description of the method embodiments of the present disclosure for understanding.

It should be noted that the various modules described above may be implemented by software or hardware. Implementation by hardware may, but not limited to, be performed in the following manners: the modules described above are all disposed in the same processor; or, the various modules described above are disposed in different processors in any combination.

Embodiment 3

This embodiment is an optional embodiment according to the present disclosure, and is used to describe the present application in detail in conjunction with specific implementations.

Implementation 1 (the Core Network Calculates the Session AMBR at the Secondary Base Station)

Figure 8:
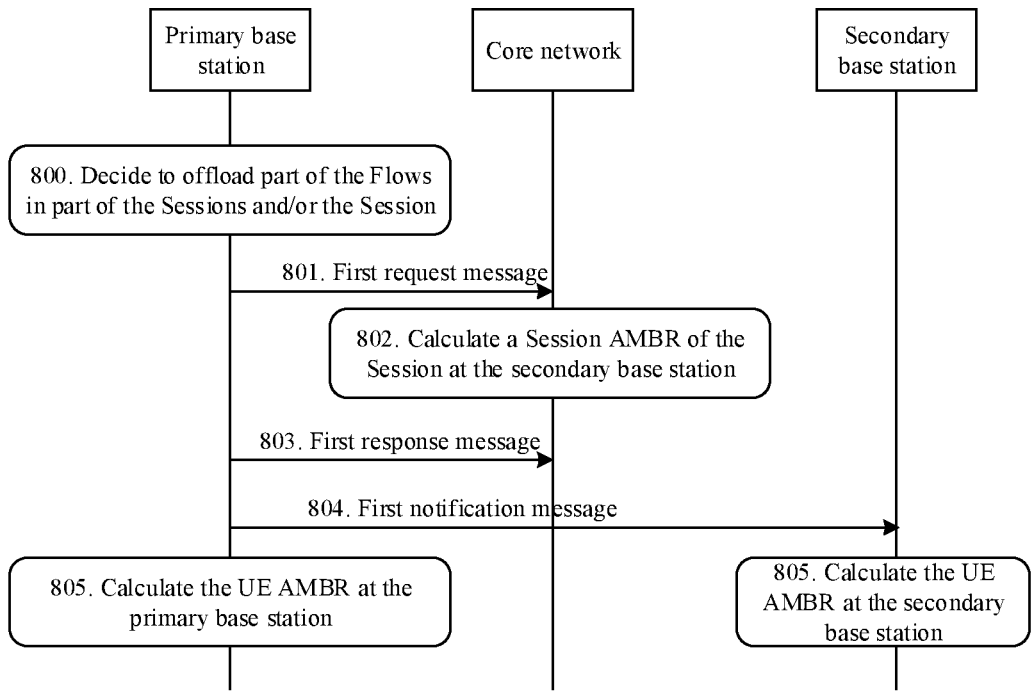
FIG. 8 is a flowchart of implementations 1 to 3.

FIG. 8 is a flowchart of implementations 1 to 3. As shown in FIG. 8, this implementation includes steps described below.

In step 800, the primary base station decides to offload part of the Flows in part of the Sessions and/or the Session to the secondary base station.

In step 801, the primary base station sends a first request message to the core network.

The first request message carries information that part of the Flows in the session are offloaded to the secondary base station, the information includes a Session identifier of the Session, and a Flow identifier of at least one Flow offloaded to the secondary base station in each session.

In step 802, the core network calculates Session aggregate maximum bit rates (Session AMBRs) of the Session at the primary base station and the secondary base station according to the received information of part of the Flows offloaded to the secondary base station in the Session.

In step 803, the core network sends a first response message to the primary base station, The first response message carries Session AMBRs at the primary base station and the secondary base station of the Session with part of the Flows offloaded to the secondary base station.

In step 804, the primary base station sends a first notification message to the secondary base station.

The first notification message carries Session AMBR information at the secondary base station of the Session with part of the Flows offloaded to the secondary base station, and the Session AMBR information includes a Session identifier of the Session and a Session AMBR of each Session at the secondary base station.

In step 805, the primary base station and the secondary base station respectively calculate their own UE AMBR.

The UE AMBR at the primary base station is a sum of respective Session AMBRs of the UE at the primary base station, and the UE AMBR at the secondary base station is a sum of respective Session AMBRs of the UE at the secondary base station.

Implementation 2 (the Core Network Calculates the Session AMBR at the Secondary Base Station)

Step 800 is the same as implementation 1.

Step 801 is the same as implementation 1.

In step 802, the core network calculates a Session aggregate maximum bit rate (Session AMBR) of the Session at the secondary base station according to the received information in the Session with part of the Flows offloaded to the secondary base station.

In step 803, the core network sends a first response message to the primary base station.

The first response message carries Session AMBR at the secondary base station of the Session with part of the Flows offloaded to the secondary base station.

Step 804 is the same as implementation 1.

In step 805, the primary base station and the secondary base station respectively calculate their own UE AMBR.

The UE AMBR at the primary base station is a sum of respective Session AMBRs of the UE at the primary base station (the Session AMBR at the primary base station may be obtained by subtracting the Session AMBR at the secondary base station from the old Session AMBR), and the UE AMBR at the secondary base station is a sum of respective Session AMBRs of the UE at the secondary base station.

Implementation 3 (the Core Network Calculates the Session AMBR at the Secondary Base Station)

In step 800, the primary base station decides to offload part of the Flows in part of the Sessions and/or the Session to the secondary base station.

In step 801, the primary base station sends a first request message to the core network.

The first request message carries information that part of the Flows in the session are offloaded to the secondary base station, the information includes a session identifier of the Session, and a Session AMBR of each offloaded Session at the secondary base station (or a Session AMBR percentage of each offloaded Session at the secondary base station).

In step 802, The core network determines which Flows in the session are offloaded to the secondary base station according to the received information of part of the Flows offloaded to the secondary base station in the Session, and recalculates Session AMBRs of this session at the primary base station and the secondary base station according to the determined information of the Flow offloaded to the secondary base station.

In step 803, the core network sends a first response message to the primary base station.

The first response message carries: Session AMBRs at the primary base station and the secondary base station of the session with part of the Flows offloaded to the secondary base station, and a Flow identifier of at least one Flow offloaded to the secondary base station in each session.

In 804, the primary base station sends a first notification message to the secondary base station.

The first notification message carries Session AMBR information at the secondary base station of the Session with part of the Flows offloaded to the secondary base station, the Session AMBR information includes a Session identifier of the Session, a Session AMBR of each Session at the secondary base station, and a Flow identifier of at least one Flow offloaded to the secondary base station in each session.

In step 805, the primary base station and the secondary base station respectively calculate their own UE AMBR.

The UE AMBR at the primary base station is a sum of respective Session AMBRs of the UE at the primary base station, and the UE AMBR at the secondary base station is a sum of the Session AMBRs of the UE at the secondary base station.

Implementation 4 (the Primary Base Station Calculates the Session AMBR at the Secondary Base Station)

Figure 9:
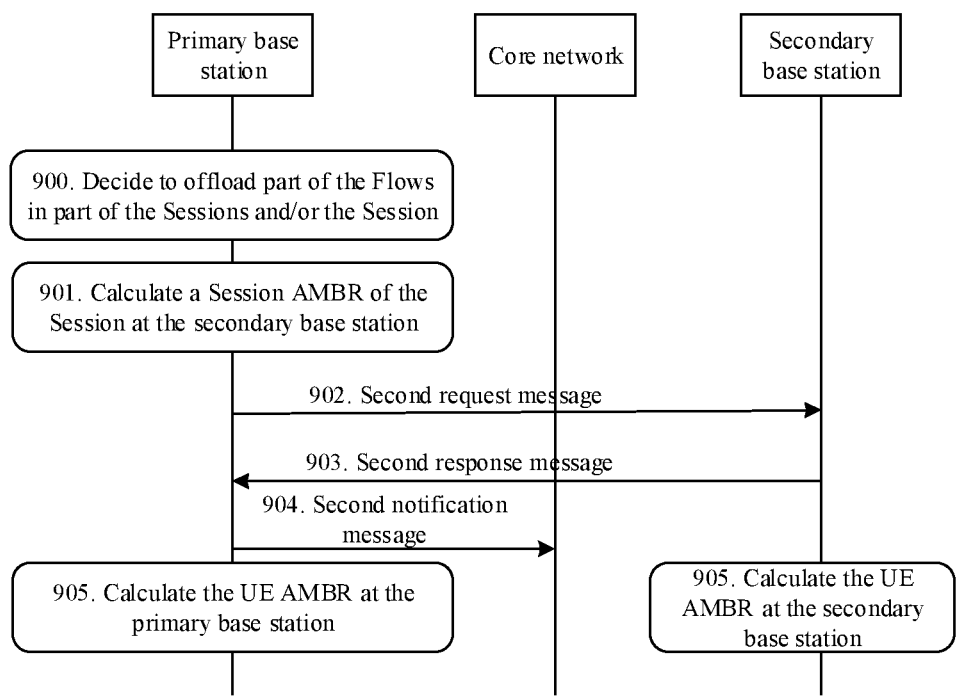
FIG. 9 is a flowchart of implementation 4.

FIG. 9 is a flowchart of implementation 4. As shown in FIG. 9, this implementation includes steps described below.

In step 900, the primary base station decides to offload part of the Flows in part of the Sessions and/or the Session to the secondary base station.

In step 901, the primary base station calculates a Session aggregate maximum bit rate (Session AMBR) of the Session at the primary base station and the secondary base station according to the information of part of the Flows offloaded to the secondary base station in the Session.

In step 902, the primary base station sends a second request message to the secondary base station.

The second request message carries information that part of the Flows in the Session are offloaded to the secondary base station, the information includes a Session identifier of the Session, and a Session AMBR at the secondary base station in each Session.

In step 903, the secondary base station sends a second response message to the primary base station.

The second response message indicates that a request of the primary base station is completely or partially accepted, when indicating that the request of the primary base station is partially accepted, the second response message carries a session identifier of a rejected offloaded Session, a rejected session AMBR at the secondary base station, and a proposed session AMBR at the secondary base station.

In step 904, the primary base station sends a second notification message to the core network.

The second notification message carries Session AMBR information at the secondary base station of the Session with part of the Flows offloaded to the secondary base station, and the Session AMBR information includes a Session identifier of the Session and a Session AMBR of each Session at the secondary base station.

In step 905, the primary base station and the secondary base station respectively calculate their own UE AMBR.

The UE AMBR at the primary base station is a sum of respective Session AMBRs of the UE at the primary base station, and the UE AMBR at the secondary base station is a sum of respective Session AMBRs of the UE at the secondary base station.

With the method of this embodiment, when a dual connectivity operation is performed in a 5G network, the allocation and calculation of the Session AMBR and the UE AMBR may be performed well.

Embodiment 4

In the embodiment of the present disclosure, if the method for session offloading described above is implemented in the form of a software function module and sold or used as an independent product, it may also be stored in a computer readable storage medium. Based on such understanding, the embodiments of the present disclosure, either essentially or in terms of contributions to the related art, may be embodied in the form of a software product, the computer software product is stored in a storage medium, the storage medium includes multiple instructions for enabling a computing device (which may be a personal computer, a server, or a network device, etc.) to perform all or part of the methods described in various embodiments of the present disclosure. The foregoing storage medium includes various media capable of storing a program code, such as a U disk, a mobile hard disk, a read only memory (ROM), a disk, or a CD. Thus, embodiments of the present disclosure are not limited to any specific combination of hardware and software.

Correspondingly, an embodiment of the present disclosure further provides a storage medium. In this embodiment, the above-mentioned storage medium may be configured to store a program code for performing steps described below.

In S1, a session AMBR of an offloaded session at a secondary base station is determined;

In S2, a primary base station sends the session AMBR at the secondary base station to the secondary base station.

In one or more embodiments, the above-mentioned storage medium may include, but is not limited to, various media capable of storing a program code, such as a U disk, a read-only memory (ROM), a random access memory (RAM), a mobile hard disk, a disk, or a CD.

In one or more embodiments, the processor performs that, according to the stored program code in the storage medium, the session AMBR of the offloaded session at the secondary base station is determined.

In one or more embodiments, the processor performs that, according to the stored program code in the storage medium, the primary base station sends the session AMBR at the secondary base station to the secondary base station.

For specific examples in this embodiment, reference may be made to the examples described in the foregoing embodiments and the optional implementations, and details are not described herein again.

Correspondingly, an embodiment of the present disclosure provides a device for session offloading (a network device in a base station or a core network), the device for session offloading includes a memory and a processor, where the memory stores a computer program executable by the processor, where the processor, when executing the program, implements the steps in the method for the above-described session offloading.

It should be understood that the phrase "one embodiment" or "an embodiment" mentioned throughout the specification means that a particular feature, structure or characteristic related to the embodiments is included in at least one embodiment of the present disclosure. Therefore, the appearance of the phrase "in one embodiment" or "in an embodiment" in various places throughout the specification is not necessarily referring to the same embodiment. In addition, these particular features, structures, or characteristics may be combined in one or more embodiments in any suitable manner. It should be understood that, in various embodiments of the present disclosure, the size of the sequence numbers of the above-mentioned processes does not mean the order of execution, and the order of execution of each process should be determined by its function and internal logic, which should not constitute any limitation on the implementation processes of the embodiments of the present disclosure. The implementation process constitutes any limitation. The serial numbers of the embodiments described above of the present disclosure are merely for ease of description, and do not represent the advantages and disadvantages of the embodiments.

It should be noted that as used herein, the term "including", "containing" or any other variants thereof is intended to encompass a non-exclusive inclusion, such that a process, method, article, or apparatus including a series of elements not only includes the expressly listed elements but also includes other elements that are not expressly listed or are inherent to such a process, method, article, or apparatus. In the absence of more restrictions, the elements defined by the phrase "including a . . . " do not exclude the presence of additional identical elements in the process, method, item, or apparatus that includes the elements.

In the several embodiments provided by the present application, it should be understood that the disclosed device and method may be implemented in other ways. The device embodiments described above are merely illustrative. For example, the division of the unit is merely a logical function division, and, in practice, the division of the unit may be implemented in other ways. For example, multiple units or components may be combined or may be integrated into another system, or some features may be omitted or not executed. In addition, the coupling, direct coupling, or communication connection between the presented or discussed components may be indirect coupling or communication connection via some interfaces, devices or units, and may be electrical, mechanical or other forms.

The units described above as separate components may or may not be physically separated, and the components displayed as the unit may or may not be physical units, that is, the units described above as separate components may be located in one place or distributed over multiple network units. Part or all of the units may be selected according to practical requirements to achieve the objects of this embodiment.

It is to be understood by those skilled in the art that all or part of the steps of implementing the foregoing method embodiments may be implemented by hardware related to program instructions. The foregoing program may be stored in a computer readable storage medium, and the program is executed to perform the foregoing steps of the method embodiment described above; and the foregoing storage medium includes various media capable of storing a program code, such as a mobile storage device, a read only memory (ROM), a disk, or a CD, and the like.

Alternatively, the above-described integrated unit of the present disclosure may be stored in a computer readable storage medium if it is implemented in the form of a software function module and sold or used as an independent product. Based on such understanding, the embodiments of the present disclosure, either essentially or in terms of contributions to the related art, may be embodied in the form of a software product. The computer software product is stored in a storage medium, the storage medium includes several instructions for enabling a device (which may be a base station or a network device in a core network, etc.) to perform all or part of the methods described in various embodiments of the present disclosure. The foregoing storage medium includes various media capable of storing a program code, such as a mobile storage device, a ROM, a disk, or a CD.

The above is only the implementation of the present disclosure, but the protection scope of the present disclosure is not limited thereto. It is easy for those skilled in the art to conceive modifications or substitutions within the technical scope disclosed by the present disclosure. These modifications or substitutions are within the scope of the present disclosure. Therefore, the protection scope of the present disclosure should be determined by the protection scope of the appended claims.

What is claimed is:

1. A method for session offloading, comprising:
  offloading a protocol data unit session (PDU Session) among a plurality of PDU sessions of a User Equipment (UE) from a primary base station to a secondary base station, the PDU Session including a plurality of quality of service (QoS) flows,
  wherein an offloaded PDU session at the second base station includes part of the QoS flows that are offloaded from the primary base station to the secondary base station;

determining, by the primary base station, a session aggregation maximum bit rate (AMBR) for each of the QoS flows included in the offloaded PDU session; and sending, by the primary base station, the session aggregation maximum bit rate (AMBR) for each of the QoS flows included in the offloaded PDU session to the secondary base station.

2. The method of claim 1, wherein determining, by the primary base station, the session AMBR for each of the QoS flows included in the offloaded PDU session comprises one of:

acquiring, by the primary base station, the session AMBR for each of the QoS flows included in the offloaded PDU session from a core network; or generating, by the primary base station, the session AMBR for each of the QoS flows included in the offloaded PDU session.

3. The method of claim 2, wherein acquiring, by the primary base station, the session AMBR for each of the QoS flows included in the offloaded PDU session from the core network comprises:

sending, by the primary base station, a request message to the core network; and receiving, by the primary base station, a first response message fed back by the core network based on the request message, wherein the first response message carries the session AMBR for each of the QoS flows included in the offloaded PDU session, and the session AMBR for each of the QoS flows included in the offloaded PDU session is obtained by the core network according to the request message.

4. The method of claim 3, wherein sending, by the primary base station, the session AMBR for each of the QoS flows included in the offloaded PDU session to the secondary base station comprises:

sending, by the primary base station, a first notification message carrying the session AMBR for each of the QoS flows included in the offloaded PDU session to the secondary base station.

5. The method of claim 3, wherein, the request message is one of: an evolved radio access bearer (E-RAB) modification indication message, a PDU session resource indication message, or a redefined message;

the first response message is one of: an E-RAB modification confirm message, a PDU session resource confirm message, or a redefined message.

6. The method of claim 3, wherein the request message carries offloading information of a QoS Flow in the PDU session, wherein the offloading information of the QoS Flow comprises: a session identifier of the PDU session, and a Flow identifier of at least one QoS Flow offloaded to the secondary base station in each PDU session, or wherein the request message carries offloading information of the PDU session, wherein the offloading information of the PDU session comprises: a session identifier of the PDU session, and a session AMBR or a session AMBR percentage of each offloaded PDU session at the secondary base station.

7. The method of claim 2, wherein generating, by the primary base station, the session AMBR for each of the QoS flows included in the offloaded PDU session comprises:

generating, by the primary base station, the session AMBR for each of the QoS flows included in the offloaded PDU session according to quality of service (QoS) information of the part of the QoS flows offloaded to the secondary base station, wherein sending, by the primary base station, the session AMBR for each of the QoS flows included in the offloaded PDU session to the secondary base station comprises:

sending, by the primary base station, a request message carrying the session AMBR for each of the QoS flows included in the offloaded PDU session to the secondary base station.

8. The method of claim 7, wherein after sending, by the primary base station, the request message carrying the session AMBR for each of the QoS flows included in the offloaded PDU session to the secondary base station, the method further comprises:

receiving, by the primary base station, a second response message sent by the secondary base station, wherein the second response message is used to indicate that a request of the primary base station is completely or partially accepted, and in a case of indicating that the request of the primary base station is partially accepted, the second response message carries at least one of: a session identifier of a rejected offloaded PDU session, a rejected session AMBR at the secondary base station, or a proposed session AMBR at the secondary base station, wherein after receiving, by the primary base station, the second response message sent by the secondary base station, the method further comprises:

sending, by the primary base station, a second notification message to the core network, wherein the second notification message carries session AMBR information at the secondary base station of the part of the QoS flows offloaded to the secondary base station, and the session AMBR information at the secondary base station comprises: a session identifier of the PDU session, and a session AMBR of each PDU session at the secondary base station, or wherein after sending, by the primary base station, the session AMBR for each of the QoS flows included in the offloaded PDU session to the secondary base station, the method further comprises:

calculating, by the primary base station, a UE AMBR of the primary base station, wherein the UE AMBR of the primary base station is a sum of respective session AMBRs of the UE at the primary base station.

9. The method of claim 8, wherein, the second response message is one of: a SENB addition request acknowledgement message, a SGNB addition request acknowledgement message, or a redefined message;

the second notification message is one of: an E-RAB modification indication message, a PDU session resource indication message, or a redefined message.

10. The method of claim 7, wherein, the request message is one of: a SENB addition request message, a SGNB addition request message, or a redefined message.

11. An apparatus for session offloading, applied to a primary base station, wherein the apparatus comprises:
a processor; and
a memory for storing instructions executable by the processor,
wherein processor, when executing the instructions, is configured to implement the method of claim 1.

12. A non-transitory storage medium, comprising a stored program, wherein the stored program is executed to perform the method of claim 1.

13. A method for session offloading, comprising:
offloading a protocol data unit session (PDU Session) among a plurality of PDU sessions of a User Equipment (UE) from a primary base station to a secondary base station, the PDU Session including a plurality of quality of service (QoS) flows,
wherein an offloaded PDU session at the second base station includes part of the QoS flows that are offloaded from the primary base station to the secondary base station;
calculating, by a core network, a session aggregation maximum bit rate (AMBR) for each of the QoS flows included in the offloaded PDU session; and
sending, by the core network, the session aggregation maximum bit rate (AMBR) for each of the QoS flows included in the offloaded PDU session to the secondary base station.

14. The method of claim 13, wherein calculating, by the core network, the session AMBR for each of the QoS flows included in the offloaded PDU session comprises:
receiving, by the core network, a request message sent by the primary base station; and
calculating, by the core network, the session AMBR for each of the QoS flows included in the offloaded PDU session according to information in the request message.

15. The method of claim 14, wherein the request message carries offloading information of a QoS Flow in the PDU session, wherein the offloading information of the QoS Flow comprises: a session identifier of the PDU session, and a Flow identifier of at least one QoS Flow offloaded to the secondary base station in each PDU session,
wherein calculating, by the core network, the session AMBR for each of the QoS flows included in the offloaded PDU session according to the information in the request message comprises:
obtaining, by the core network, quality of service (QoS) information of the part of the QoS flows offloaded to the secondary base station according to the information in the request message; and
determining, by the core network, the session AMBR for each of the QoS flows included in the offloaded PDU session according to the QoS information of the part of the QoS flows offloaded to the secondary base station,
or, wherein the request message carries offloading information of the PDU session, wherein the offloading information of the PDU session comprises: a session identifier of the PDU session, and a session AMBR or a session AMBR percentage of each offloaded PDU session at the secondary base station,
wherein calculating, by the core network, the session AMBR for each of the QoS flows included in the offloaded PDU session according to the information in the request message comprises:
determining, by the core network, a QoS Flow offloaded to the secondary base station in the PDU session according to the information in the request message; and recalculating, by the core network, the session AMBR for each of the QoS flows included in the offloaded PDU session according to determined QoS information of the QoS Flow offloaded to the secondary base station.

16. The method of claim 14, wherein sending, by the core network, the session AMBR for each of the QoS flows included in the offloaded PDU session to the primary base station comprises:
sending, by the core network, the session AMBR for each of the QoS flows included in the offloaded PDU session to the primary base station through a first response message, wherein the first response message is a feedback message to the request message.

17. An apparatus for session offloading, applied to a core network, wherein the apparatus comprises:
a processor; and
a memory for storing instructions executable by the processor,
wherein processor, when executing the instructions, is configured to implement the method of claim 13.

18. A non-transitory storage medium, comprising a stored program, wherein the stored program is executed to perform the method of claim 13.

19. A method for session offloading, comprising:
offloading a protocol data unit session (PDU Session) among a plurality of PDU sessions of a User Equipment (UE) from a primary base station to a secondary base station, the PDU Session including a plurality of quality of service (QoS) flows,
wherein an offloaded PDU session at the second base station includes part of the QoS flows that are offloaded from the primary base station to the secondary base station;
receiving, by the secondary base station from the primary base station, a session aggregation maximum bit rate (AMBR) for each of the QoS flows included in the offloaded PDU session; and
calculating, by the secondary base station, a UE AMBR at the secondary base station according to the session AMBR of the offloaded PDU session at the secondary base station.

20. The method of claim 19, wherein calculating, by the secondary base station, the UE AMBR at the secondary base station according to the session AMBR of the offloaded PDU session at the secondary base station comprises:
after offloading the PDU Session among the plurality of PDU sessions of the UE from the primary base station to the secondary base station, determining, by the secondary base station, a sum of respective session AMBRs of the UE at the secondary base station as the UE AMBR at the secondary base station.

21. An apparatus for session offloading, applied to a secondary base station, wherein the apparatus comprises:
a processor; and
a memory for storing instructions executable by the processor,
wherein processor, when executing the instructions, is configured to implement the method of claim 19.

* * * * *